(12) United States Patent
Yasuda (10) Patent No.: US 8,854,957 B2
(45) Date of Patent: Oct. 7, 2014

(54) PACKET RETRANSMISSION CONTROL SYSTEM, PACKET RETRANSMISSION CONTROL METHOD AND RETRANSMISSION CONTROL PROGRAM

(75) Inventor: Masato Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 291 days.

(21) Appl. No.: 13/260,689

(22) PCT Filed: Mar. 25, 2010

(86) PCT No.: PCT/JP2010/055187
§ 371 (c)(1),
(2), (4) Date: Sep. 27, 2011

(87) PCT Pub. No.: WO2010/110356
PCT Pub. Date: Sep. 30, 2010

(65) Prior Publication Data
US 2012/0082030 A1    Apr. 5, 2012

(30) Foreign Application Priority Data
Mar. 27, 2009  (JP) .................. 2009-078490

(51) Int. Cl.
*H04L 1/00*       (2006.01)
*H04L 12/26*      (2006.01)
*H04L 29/08*      (2006.01)
*H04L 1/18*       (2006.01)
*H04L 29/14*      (2006.01)

(52) U.S. Cl.
CPC ............... *H04L 1/188* (2013.01); *H04L 69/324* (2013.01); *H04L 69/40* (2013.01); *H04L 1/18* (2013.01)
USPC ......... 370/229; 370/230; 370/230.1; 370/232

(58) Field of Classification Search
CPC .............. H04L 1/18; H04L 1/16; H04L 1/12; H04L 1/1809; H04L 1/1806; H04L 1/1803; H04L 1/1812; H04L 1/1816; H04L 1/1819

USPC .............. 370/229, 230, 230.1, 231, 232, 234, 370/235
See application file for complete search history.

(56) References Cited

U.S. PATENT DOCUMENTS 6,496,481 B1 * 12/2002 Wu et al. ....................... 370/242

FOREIGN PATENT DOCUMENTS

| JP | 55-137742 | 10/1980 |
|---|---|---|
| JP | 10-126772 | 5/1998 |

(Continued)

OTHER PUBLICATIONS

International Search Report, PCT/JP2010/055187, Jun. 15, 2010.
Toru Takamichi et al., "100Gbps Ultra-High Speed MAC Technology", IEICE Technical Report, vol. 108, No. 423, Jan. 26, 2009, pp. 31 to 36, OCS2008-112 (English Abstract included).

(Continued)

*Primary Examiner* — Kwang B Yao
*Assistant Examiner* — Adam Duda
(74) *Attorney, Agent, or Firm* — Young & Thompson (57) ABSTRACT

A packet retransmission control system includes an application processing module on which an application for executing communication processing operates, a retransmission control determination module which determines whether to execute high-speed retransmission control by a lower layer based on a predetermined rule with respect to a packet whose sending is requested by the application processing module, a packet processing branching module which allocates a packet determined to be subjected to high-speed retransmission control and a packet determined not to be subjected to high-speed retransmission control, an MAC retransmission control module which executes retransmission control of a transmission packet by a retransmission time-out shorter in time than a protocol of a transport layer with respect to a packet determined to be subjected to high-speed retransmission control, and an external output module which externally outputs a packet sent from the MAC retransmission control module or the packet processing branching module.

30 Claims, 8 Drawing Sheets

(56) References Cited

FOREIGN PATENT DOCUMENTS

| JP | 11-177536 | 7/1999 |
| JP | 2005-020528 | 1/2005 |
| JP | 2006-186557 | 7/2006 |

OTHER PUBLICATIONS

Toru Takamichi et al., "Ultra-High Speed MAC Technology for Terabit-Class LAN", Proceedings of the 2008 IEICE Society Conference. (The concise explanation of relevance is provided in the specification itself, p. 1, line 23 through p. 2, line 27).

* cited by examiner

PACKET RETRANSMISSION CONTROL SYSTEM, PACKET RETRANSMISSION CONTROL METHOD AND RETRANSMISSION CONTROL PROGRAM

TECHNICAL FIELD

The present invention relates to a packet retransmission control system and, more particularly, a packet retransmission control method of retransmitting a packet of a lower layer of a network in a case where a higher layer is a protocol for executing retransmission processing such as TCP (Transport Control Protocol).

BACKGROUND ART

TCP has a parameter called retransmission time-out existing and when a packet is abandoned on a path in a network, a TCP stack retransmits the packet after waiting for a lapse of a retransmission time-out. TCP stack is in general mounted on OS (Operating System).

Since OS is mounted in software here, retransmission time-out of TCP cannot be determined with high precision. For example, since a unit time (Jiffies) of Linux is on a 10-millisecond basis, a standard TCP stack of Linux is not allowed to have a retransmission time-out reduced to be less than 10 milliseconds.

In a network whose RTT (Round Trip Time) is extremely short such as a data center, by reducing a retransmission time-out down to be of the order of microseconds, FCT (Flow Completion Time) is decreased to improve communication efficiency. Since a TCP stack operable on OS is not allowed to have the retransmission time-out reduced down to a microsecond level for the above-described reason, FCT cannot be reduced in such a network.

Proposed for solving the problem is such a packet retransmission control system as disclosed in Non-Patent Literature 1 as related art. According to the packet retransmission control system recited in the Non-Patent Literature 1, packet retransmission is controlled by executing time-out determination on a microsecond level in a MAC layer lower than a TCP layer. This enables FCT to be reduced in a network whose RTT is short and improves communication efficiency without changing a structure of OS or a TCP stack.

Non-Patent Literature 1: Toru Takamichi, Masahiro Shigihara and Kiyoshoi Fukuchi, "Ultra-High Speed MAC Technology for Terabit-Class LAN", Proceedings of the 2008 IEICE Society Conference.

First problem of the packet retransmission control technique according to the related art is that an effect of retransmission control of a MAC layer can be obtained only in a short flow.

The reason is that since at the time of long flow data transfer, a fast retransmission function of TCP is started by three or more successive overlapping TCP-ACK (Acknowledgement) packets, a missing packet will be retransmitted without waiting for retransmission time-out.

As a result, a packet is retransmitted on the TCP level without waiting for retransmission time-out in the packet retransmission control technique, so that none of the effects of the packet retransmission control technique can be obtained in a long flow.

Short flow denotes a flow whose transfer data size per TCP flow is small. More specifically, it denotes a flow formed of one or two packets. In contrast with a short flow, long flow denotes a flow whose transfer data size per TCP flow is large.

On the other hand, in a case of a short flow, three or more successive overlapping ACK fail to occur which trigger fast retransmission. Accordingly, even when packet abandonment occurs, retransmission of a missing packet by TCP will not be executed until retransmission time-out of TCP.

Second problem is an increase in a packet abandonment rate when congestion occurs in a long flow of TCP.

The reason is that even when a packet is abandoned at a switch (network switch) on a path, a missing packet will be retransmitted in a MAC layer by the packet retransmission control technique, so that the TCP layer fails to sense abandonment of the packet and therefore, no TCP congestion algorithm works even when congestion occurs, which prevents a decrease in a sending rate.

Object of the Invention

An object of the present invention is to provide a packet retransmission control system, a packet retransmission control method and a retransmission control program which realize such a dynamic switching function as applying high-speed retransmission control only to a short flow in which an effect of high-speed packet retransmission control of a MAC layer is obtained and refraining from executing high-speed retransmission control at the time of long flow transfer in which an adverse effect is exerted by high-speed packet retransmission control.

Another object of the present invention is to provide a packet retransmission control system, a packet retransmission control method and a retransmission control program which realize dynamic switching with an existing TCP protocol stack remaining the same without changing a protocol stack on a host.

SUMMARY

According to a first exemplary aspect of the invention, a packet retransmission control system which executes high-speed retransmission control of a lower layer of a transmission packet by a retransmission time-out shorter in time than a protocol of a transport layer, includes an application processing module on which an application for executing communication processing operates, a retransmission control determination module which determines whether to execute high-speed retransmission control by a lower layer based on a predetermined condition with respect to a packet whose sending is requested by the application processing module, a packet processing branching module which allocates a packet determined to be subjected to high-speed retransmission control and a packet determined not to be subjected to high-speed retransmission control, an MAC retransmission control module which executes retransmission control of a transmission packet by the retransmission time-out shorter in time than the protocol of the transport layer with respect to a packet determined to be subjected to high-speed retransmission control, and an external output module which externally outputs a packet sent from the MAC retransmission control module or the packet processing branching module.

According to a second exemplary aspect of the invention, a packet retransmission control system which executes high-speed retransmission control of a lower layer of a transmission packet by a retransmission time-out shorter in time than a protocol of a transport layer, includes an application processing module on which an application for executing communication processing operates and which notifies information indicating whether to validate retransmission control of the lower layer with respect to transmission data together with a data transmission request, a retransmission control determination module which determines whether to execute high-speed retransmission control by the lower layer with respect to a sending-out packet based on the information notified from the application processing module, a packet processing branching module which allocates a packet determined to be subjected to high-speed retransmission control and a packet determined not to be subjected to high-speed retransmission control, an MAC retransmission control module which executes retransmission control of a transmission packet by the retransmission time-out shorter in time than the protocol of the transport layer with respect to a packet determined to be subjected to high-speed retransmission control, and an external output module which externally outputs a packet sent from the MAC retransmission control module or the packet processing branching module.

According to a third exemplary aspect of the invention, a packet retransmission control method by a packet retransmission control system which executes high-speed retransmission control of a lower layer of a transmission packet by a retransmission time-out shorter in time than a protocol of a transport layer, includes an application processing step of making a data transmission request, a retransmission control determination step of determining whether to execute high-speed retransmission control by a lower layer based on a predetermined condition with respect to a packet whose transmission is requested, a packet processing branching step of allocating a packet determined to be subjected to high-speed retransmission control and a packet determined not to be subjected to high-speed retransmission control, a MAC retransmission control step of executing retransmission control of a transmission packet by the retransmission time-out shorter in time than the protocol of the transport layer with respect to a packet determined to be subjected to high-speed retransmission control, and an external output step of externally outputting a packet sent from the MAC retransmission control step or the packet processing branching step.

According to a fourth exemplary aspect of the invention, a packet retransmission control method by a packet retransmission control system which executes high-speed retransmission control of a lower layer of a transmission packet by a retransmission time-out shorter in time than a protocol of a transport layer, includes an application processing step of notifying information indicating whether to validate retransmission control of the lower layer with respect to transmission data together with a data transmission request, a retransmission control determination step of determining whether to execute high-speed retransmission control by the lower layer with respect to a sending-out packet based on the information notified from the application processing step, a packet processing branching step of allocating a packet determined to be subjected to high-speed retransmission control and a packet determined not to be subjected to high-speed retransmission control, a MAC retransmission control step of executing retransmission control of a transmission packet by the retransmission time-out shorter in time than the protocol of the transport layer with respect to a packet determined to be subjected to high-speed retransmission control, and an external output step of externally outputting a packet sent from the MAC retransmission control step or the packet processing branching step.

According to a fifth exemplary aspect of the invention, a packet retransmission control program executed on a computer device formed of a packet retransmission control system which executes high-speed retransmission control of a lower layer of a transmission packet by a retransmission time-out shorter in time than a protocol of a transport layer, which causes the computer device to execute an application processing function of making a data transmission request, a retransmission control determination function of determining whether to execute high-speed retransmission control by a lower layer based on a predetermined condition with respect to a packet whose transmission is requested, a packet processing branching function of allocating a packet determined to be subjected to high-speed retransmission control and a packet determined not to be subjected to high-speed retransmission control, a MAC retransmission control function of executing retransmission control of a transmission packet by the retransmission time-out shorter in time than the protocol of the transport layer with respect to a packet determined to be subjected to high-speed retransmission control, and an external output function of externally outputting a packet sent from the MAC retransmission control function or the packet processing branching function.

According to a sixth exemplary aspect of the invention, a packet retransmission control program executed on a computer device forming a packet retransmission control system which executes high-speed retransmission control of a lower layer of a transmission packet by a retransmission time-out shorter in time than a protocol of a transport layer, which causes the computer device to execute an application processing function of notifying information indicating whether to validate retransmission control of the lower layer with respect to transmission data together with a data transmission request, a retransmission control determination function of determining whether to execute high-speed retransmission control by the lower layer with respect to a sending-out packet based on the information notified from the application processing function, a packet processing branching function of allocating a packet determined to be subjected to high-speed retransmission control and a packet determined not to be subjected to high-speed retransmission control, a MAC retransmission control function of executing retransmission control of a transmission packet by the retransmission time-out shorter in time than the protocol of the transport layer with respect to a packet determined to be subjected to high-speed retransmission control, and an external output function of externally outputting a packet sent from the MAC retransmission control function or the packet processing branching function.

The present invention enables dynamic control of, with respect to a transmission packet, executing MAC retransmission control only in a short flow in which high-speed retransmission control of a MAC layer effectively works and refraining from executing MAC retransmission control at the time of a long flow in which an adverse effect is exerted by the high-speed packet retransmission control of the MAC layer.

EXEMPLARY EMBODIMENT

Next, exemplary embodiments of the present invention will be described in detail with reference to the drawings.

First Exemplary Embodiment

Figure 1:
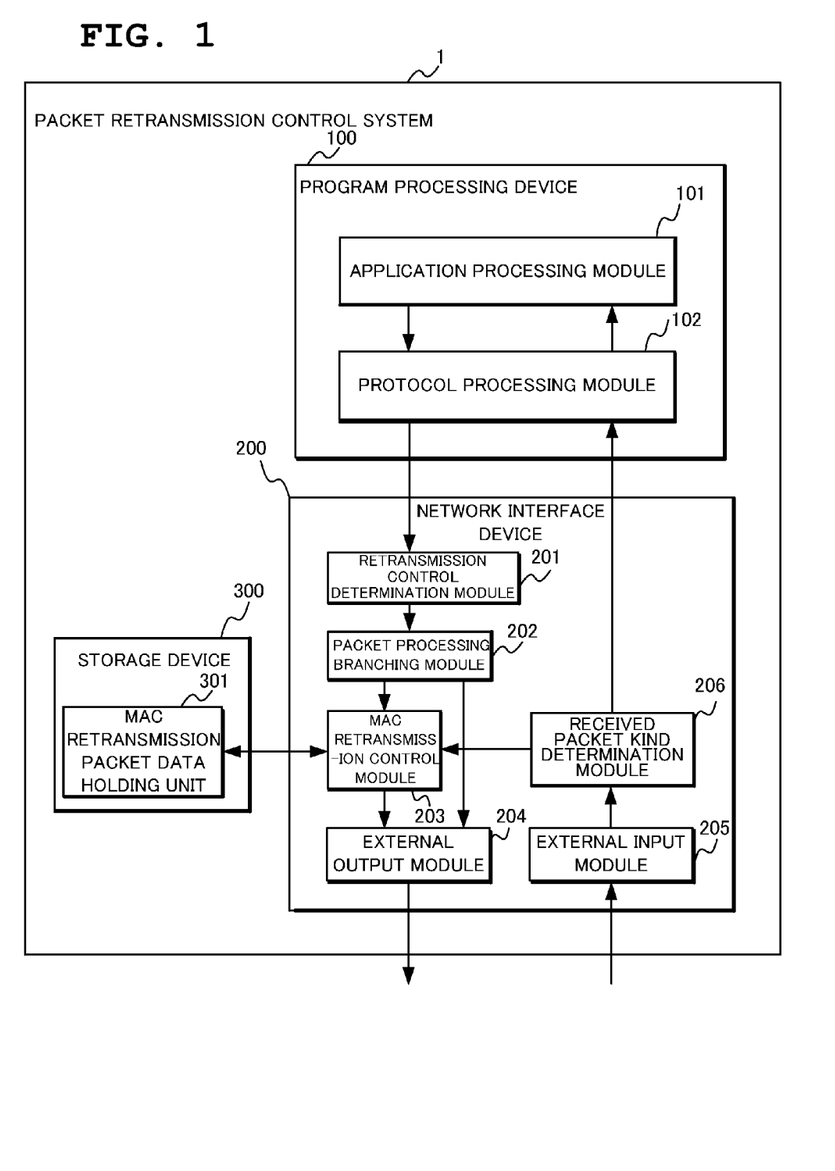
FIG. 1 is a block diagram showing an example of a structure of a packet retransmission control system according to a first exemplary embodiment of the present invention.

With reference to FIG. 1, a packet retransmission control system 1 according to a first exemplary embodiment of the present invention includes a program processing device 100, a network interface device 200 and a storage device 300.

The program processing device 100 includes an application processing module 101 which executes an application and a protocol processing module 102 which executes protocol processing such as TCP.

The program processing device 100 is realized by a CPU (Central Processing Unit) of a host such as a server, a PC (Personal Computer) or the like.

The application processing module 101, on which an application that executes network processing operates, makes a request for network data transmission and reception to the protocol processing module 102.

The protocol processing module 102 is a network stack of OS (Operating System) operable on a host CPU and is realized in software. On the protocol processing module 102, a network protocol including retransmission control of TCP or the like operates.

The network interface device 200 includes a retransmission control determination module 201 which executes packet retransmission control determination, a packet processing branching module 202 which allocates a retransmission control valid packet and a retransmission control invalid packet, a MAC retransmission control module 203 which executes packet retransmission control, an external output module 204 which sends out a packet to a network outside the device, an external input module 205 which receives a packet arriving from a network outside the device and a received packet kind determination module 206 which determines a kind of a received packet.

The network interface device 200 is assumed to be an extension card of a host or an NIC (Network Interface Card) mounted onboard.

The retransmission control determination module 201 obtains a packet size of a packet to be sent out by counting a valid byte length of a packet to determine whether retransmission control by high-speed time-out (referred to as MAC retransmission control here) is to be realized or not on a microsecond basis.

The retransmission control determination module 201 of the present exemplary embodiment determines that the MAC retransmission control is valid when a packet size is smaller than MSS (Maximum Segment Size) and that the MAC retransmission control is invalid when it is equal to MSS.

Relationship between MSS and MTU (Maximum Transfer Unit) here is defined by the following expression according to the provision of TCP.

MSS=MTU−(Ethernet header size)−(MAC retransmission controlling header size)−(TCPIP header size)

The packet processing branching module 202 allocates a packet whose retransmission control is determined to be valid and a packet determined to be invalid by the retransmission control determination module 201.

A packet determined to be valid is allocated to the MAC retransmission control module 203 by the packet processing branching module 202 and has its retransmission controlled by the MAC retransmission control module 203. A packet determined to be invalid is allocated to the external output module 204 by the packet processing branching module 202 and externally output by the external output module 204.

With respect to a packet determined to be valid, the MAC retransmission control module 203 executes MAC retransmission control by a short retransmission time-out.

The MAC retransmission control module 203 sets a retransmission time-out at a packet transferred from the packet processing branching module 202 and holds packet data in a MAC retransmission packet data holding unit 301 of the storage device 300.

Next, the MAC retransmission control module 203 applies a header for MAC retransmission control to a packet transferred from the packet processing branching module 202 and transfers the obtained packet to the external output module 204.

When the retransmission time-out elapses before arrival of ACK to a packet sent from the external output module 204, the MAC retransmission control module 203 reads out retransmission packet data from the MAC retransmission packet data holding unit 301, again applies the header for MAC retransmission control to the packet and transfers the retransmission packet to the external output module 204.

The external output module 204 sends out a packet transferred from the packet processing branching module 202 or the MAC retransmission control module 203 to a network outside the device.

The external input module 205 receives a packet arriving from the network outside the device. The received packet is transferred to the received packet kind determination module 206.

The received packet kind determination module 206 checks a kind of the received packet.

When a kind of the received packet is ACK for MAC retransmission control, the received packet kind determination module 206 notifies the MAC retransmission control module 203 to that effect to execute retransmission time-out releasing processing or retransmission buffer region releasing processing at the MAC retransmission control module 203.

When a kind of the received packet is data with a header for MAC retransmission control, the received packet kind determination module 206 notifies the MAC retransmission control module 203 of the header information of the received packet, sends ACK for MAC retransmission control to an opposite host through the external output module 204 and transfers the received data to the program processing device 100.

When a kind of the received packet is other than those described above, the received packet kind determination module 206 transfers the received packet data to the program processing device 100.

The storage device 300 includes the MAC retransmission packet data holding unit 301. As the storage device 300, assumed is a memory to be mounted on NIC. In the MAC retransmission packet data holding unit 301, packet data for MAC retransmission is stored.

Description of Operation of the First Exemplary Embodiment

Next, detailed description will be made of operation of the packet retransmission control system 1 according to the present exemplary embodiment with reference to the drawings.

Description of Operation of Data Transmission Processing

First, detailed description will be made of operation of data transmission processing in the present exemplary embodiment with reference to FIG. 1 and FIG. 2.

Data whose transmission is requested by the application processing module 101 is supplied to the protocol processing module 102.

The protocol processing module 102 checks whether a data length of the data whose transmission is requested is larger than MSS or not and when it is larger than MSS, divides the transmission data by the MSS size (Steps A1 through A3).

The protocol processing module 102 also generates transmission data to have a form of a packet and transfers the generated transmission packet to the network interface device 200 (Step A4).

The transmission packet transferred to the network interface device 200 has its retransmission control determined by the retransmission control determination module 201.

The retransmission control determination module 201 counts a valid byte length of the transmission packet to obtain a data size of the transmission packet, obtains a payload size from the data size of the transmission packet and a header size and compares the payload size of the transmission packet with MSS (Steps A5 and A6).

When the payload size of the transmission packet is equal to MSS, the retransmission control determination module 201 determines the transmission packet to be a retransmission control invalid packet and when the payload size of the transmission packet is less than MSS, determines the transmission packet to be a retransmission control valid packet and transfers the transmission packet to the packet processing branching module 202.

The packet processing branching module 202 checks whether the transmission packet whose retransmission is to be controlled is valid for retransmission control or invalid for retransmission control.

When the transmission packet is a retransmission control invalid packet, the packet processing branching module 202 transfers the transmission packet to the external output module 204, and the external output module 204 sends out the transferred transmission packet to the network (Steps A6 and A11).

In a case where the transmission packet is a retransmission control valid packet, the packet processing branching module 202 transfers the transmission packet to the MAC retransmission control module 203.

The MAC retransmission control module 203 executes MAC retransmission control with respect to the transmission packet.

The MAC retransmission control module 203 first sets the MAC retransmission time-out to be a small value (e.g. on the order of microseconds) (Step A8).

Next, the MAC retransmission control module 203 stores the transmission packet in the MAC retransmission packet data holding unit 301 (Step A9).

Subsequently, the retransmission control module 203 applies a header for MAC retransmission control to the transmission packet (Step A10) and transfers the transmission packet with the MAC retransmission controlling header to the external output module 204.

The external output module 204 sends out the transmission packet transferred from the MAC retransmission control module 203 to the network (Step A11).

When a notice of arrival of the MAC retransmission controlling ACK to the transmission packet with the MAC retransmission controlling header is not made by the received packet kind determination module 206 within the retransmission time-out time, the MAC retransmission control module 203 reads the retransmission packet data from the MAC retransmission packet data holding unit 301 to execute retransmission processing.

The MAC retransmission control module 203 also applies the retransmission controlling header to a transmission packet to be retransmitted and transfers the packet to be retransmitted to the external output module 204.

Description of Operation of Data Reception Processing

Figure 3:
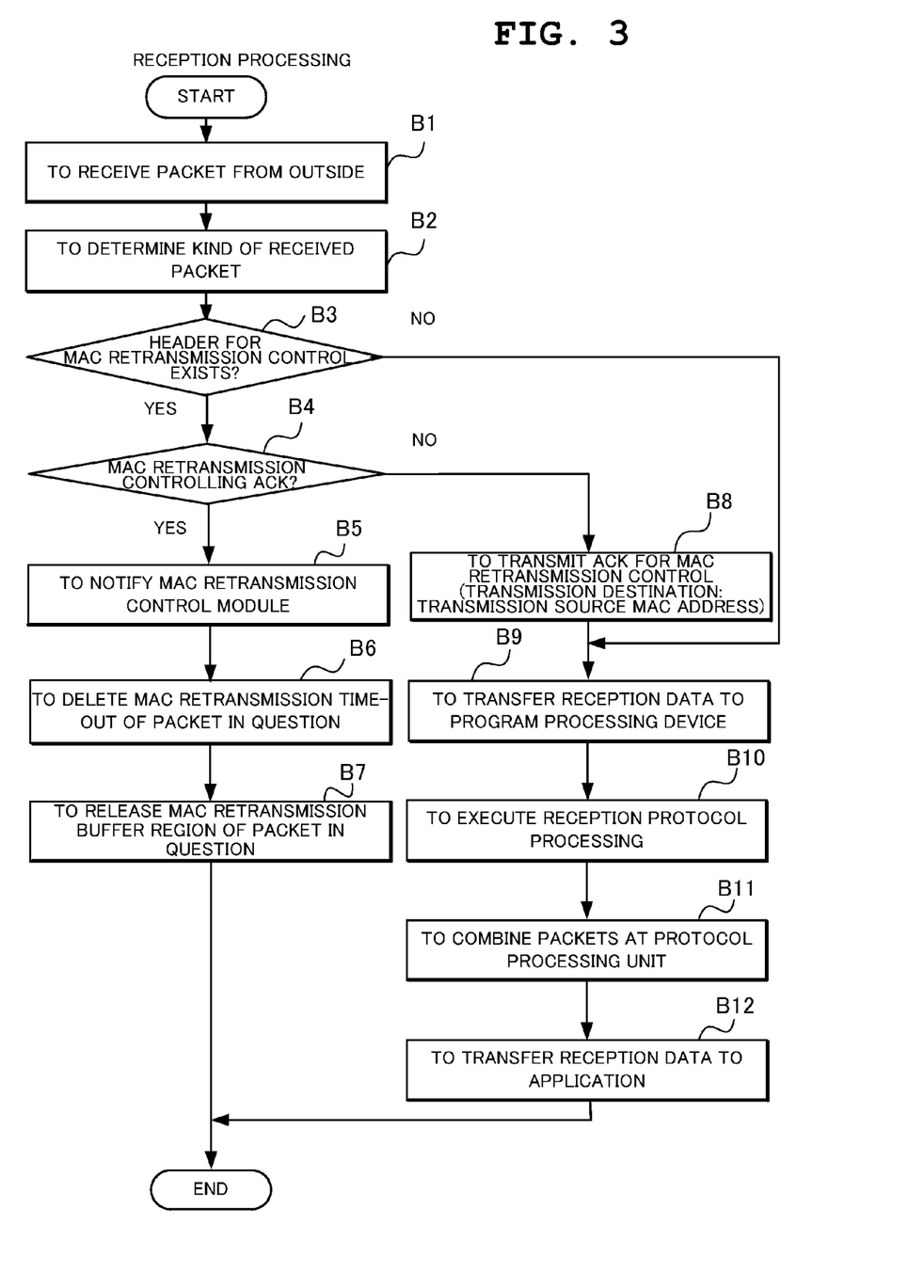
FIG. 3 is a flow chart showing operation of reception processing according to the first exemplary embodiment.

Next, detailed description will be made of operation of data reception processing according to the present exemplary embodiment with reference to FIG. 1 and FIG. 3.

Packet arriving from the outside the device (received packet) is received at the external input module 205 of the network interface device 200 and transferred to the received packet kind determination module 206 from the external input module 205 (Step B1).

The received packet kind determination module 206 determines a kind of the received packet (Step B2).

As a result of the determination, when the received packet has no MAC retransmission controlling header, the received packet kind determination module 206 recognizes the received packet as a packet whose MAC retransmission control is not to be executed and transfers the received packet to the program processing device 100. The received packet transferred is subjected to reception protocol processing at the protocol processing module 102 (Steps B3 and B9).

When the received packet has a MAC retransmission controlling header at Step B3, determine whether the packet is ACK for the transmitted data with the MAC retransmission controlling header (Step B4).

When it is ACK for the data with the MAC retransmission controlling header, the received packet kind determination module 206 notifies the MAC retransmission control module 203 to that effect (Step B5). The notified MAC retransmission control module 203 deletes an entry of the MAC retransmission time-out in the packet and deletes the MAC retransmission buffer region (Steps B6 and B7).

When the packet is not ACK although it has the MAC retransmission controlling header added, the received packet kind determination module 206 recognizes the received packet as reception of data with the MAC retransmission controlling header added, transmits the MAC retransmission controlling ACK to an opposite host through the external output module 204 (Step B8) and transfers the reception data to the program processing device 100 (Step B9). Transmission destination of the ACK for MAC retransmission control is a transmission source MAC address.

When the received packet is transferred to the program processing device 100, the protocol processing module 102 combines the received packets into a data form and transfers the reception data to the application processing module 101 (Steps B9 through B11).

First Example

Figure 4:
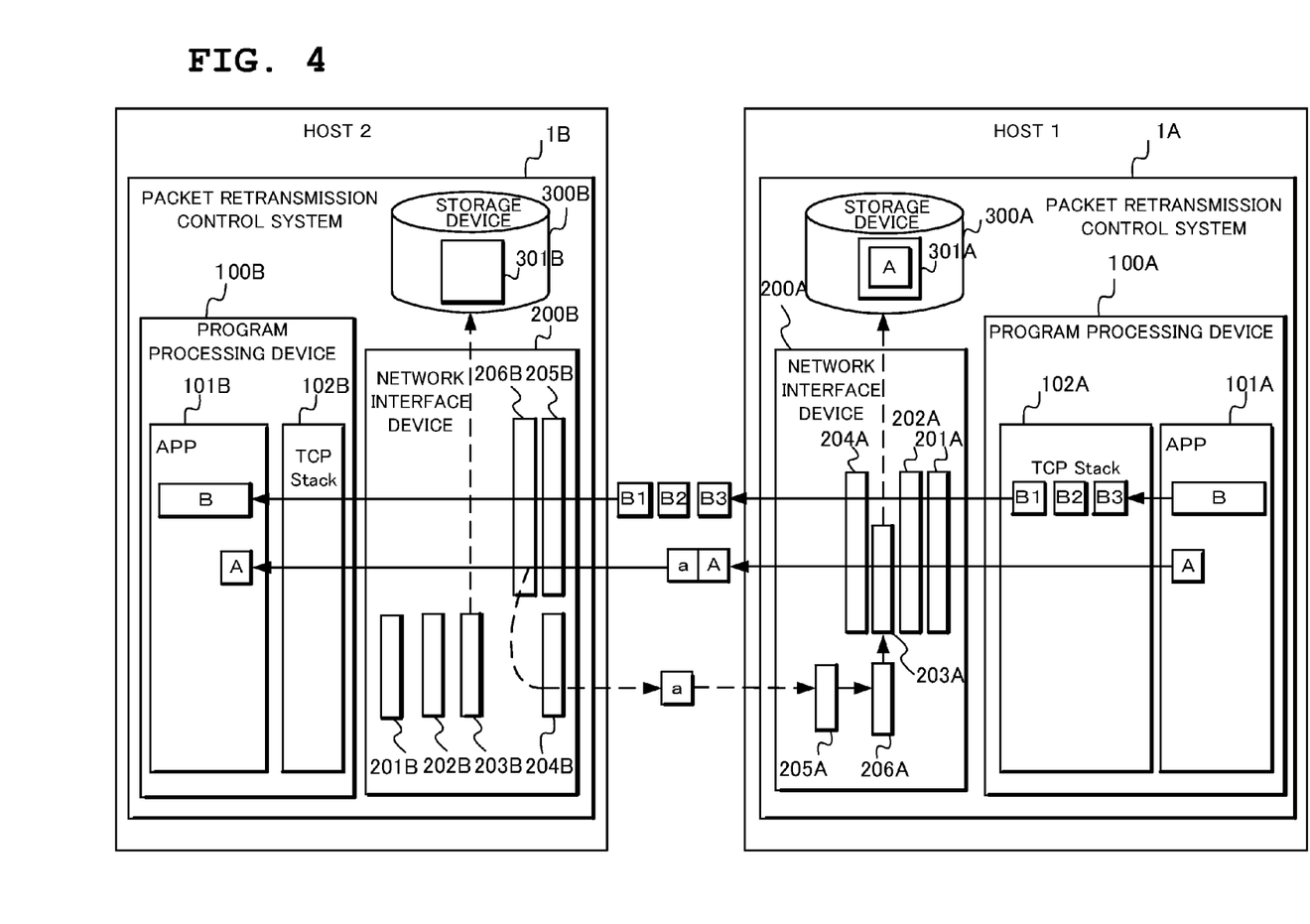
FIG. 4 is a diagram showing a specific example of operation according to the first exemplary embodiment.

Next, a specific example of operation will be described with reference to an example. FIG. 4 is a diagram showing, as one specific example of operation of the first exemplary embodiment, a case of transferring data smaller than MSS or larger than MSS.

Description of the Structure

FIG. 4 shows a case where data A whose data size is small, less than MSS, is transferred from an application processing module 101A of a host 1 and a case where data B whose data size is larger than MSS is transferred from the application processing module 101A.

The host 1 has a packet retransmission control system 1A. The packet retransmission control system 1A includes a program processing device 100A comprising the application processing module 101A and a protocol processing module 102A, a network interface device 200A comprising a retransmission control determination module 201A, a packet processing branching module 202A, a MAC retransmission control module 203A, an external output module 204A, an external input module 205A and a received packet kind determination module 206A, and a storage device 300A comprising a MAC retransmission packet data holding unit 301A.

A host 2 has a packet retransmission control system 1B. The packet retransmission control system 1B includes a program processing device 100B comprising an application processing module 101B and a protocol processing module 102B, a network interface device 200B comprising a retransmission control determination module 201B, a packet processing branching module 202B, a MAC retransmission control module 203B, an external output module 204B, an external input module 205B and a received packet kind determination module 206B, and a storage device 300B comprising a MAC retransmission packet data holding unit 301B.

The program processing device and the application processing module, the protocol processing module, the network interface device, and the retransmission control determination module, the packet processing branching module, the MAC retransmission control module, the external output module, the external input module, the storage device and the MAC retransmission packet data holding unit according to the present example have the functions equal to those of the first exemplary embodiment.

Description of the Operation

As shown in FIG. 4, assume that the data A whose data size is small, less than MSS, is transferred from the application processing module 101A of the host 1, for example.

The application processing module 101A transfers the data A to the protocol processing module 102.

The protocol processing module 102A executes TCP processing with respect to the data A to generate a TCP packet A having a MAC header and a TCPIP header attached to the data A.

Next, the protocol processing module 102A transfers the TCP packet A to the network interface device 200A.

In the network interface device 200A, the retransmission control determination module 201A first executes retransmission control determination.

The retransmission control determination module 201A counts a valid byte length of the TCP packet A to obtain a packet size and determines whether a payload size obtained by excluding the MAC header and the TCPIP header from the packet size of the TCP packet A is less than MSS or not.

Since the TCP packet A has a small data size, less than MSS, the retransmission control determination module 201A determines the TCP packet A to be a retransmission control valid packet and transfers the TCP packet A to the packet processing branching module 202A.

The packet processing branching module 202A checks whether the TCP packet A is a retransmission control valid packet or a retransmission control invalid packet.

Since the TCP packet A is a retransmission control valid packet, the packet processing branching module 202A transfers the TCP packet A to the MAC retransmission control module 203A.

The MAC retransmission control module 203A first sets the MAC retransmission time-out to be short, for example, on the order of microseconds, stores the TCP packet A in the MAC retransmission packet data holding unit 301, and then applies a header for MAC retransmission control to the TCP packet A and transfers the obtained packet to the external output module 204A.

The external output module 204A sends out the TCP packet A to the network.

The TCP packet A sent out to the network is received at the external output module 205B of the network interface device 200B of the host 2.

The external output module 205B transfers the received TCP packet A to the received packet kind determination module 206B.

The received packet kind determination module 206B checks the packet header of the TCP packet A to confirm a kind of the packet.

Since the TCP packet A is a retransmission control valid packet, the received packet kind determination module 206B determines the TCP packet A to be reception data with the MAC retransmission control information applied, transmits ACK for MAC retransmission control to the host 1 through the external output module 204B and transfers the TCP packet A to the program processing device 100B of the host 2.

In the program processing device 100B, the protocol processing module 102B first executes reception TCP processing.

The protocol processing module 102B restructures the TCP packet A into the data A and transfers the data A to the application processing module 102B.

Next, assume that the data B whose data size is larger than MSS is transferred from the application processing module 101A of the host 1.

The application processing module 101A transfers the data B to the protocol processing module 102.

The protocol processing module 102A executes the TCP processing with respect to the data B.

Since the data B is larger in size than MSS, the protocol processing module 102A divides the data B by MSS to generate TCP packets B1, B2 and B3 obtained by applying the MAC header and the TCPIP header to the divided data, respectively.

Next, the protocol processing module 102A transfers the TCP packets B1, B2 and B3 to the network interface processing device 200A.

In the network interface processing device 200A, the retransmission control determination module 201A first executes retransmission control determination.

The retransmission control determination module 201A counts valid byte lengths of the TCP packets B1, B2 and B3 to obtain packet sizes and determine whether a payload size obtained by excluding the MAC header and the TCPIP header from each packet size of the TCP packets B1, B2 and B3 is less than MSS.

Since the TCP packets B1, B2 and B3 are divided on an MSS basis by the protocol processing module 102A, the retransmission control determination module 201A recognizes that the payload size of each of the TCP packets B1, B2 and B3 is equal to MSS to determine each of the TCP packets B1, B2 and B3 to be a retransmission control invalid packet and transfers the TCP packets B1, B2 and B3 to the packet processing branching module 202A.

The packet processing branching module 202A checks whether each of the TCP packets B1, B2 and B3 is a retransmission control valid packet or a retransmission control invalid packet.

Since the TCP packets B1, B2 and B3 are retransmission control invalid packets, the packet processing branching module 202A transfers the TCP packets B1, B2 and B3 to the external output module 204A.

The external output module 204A sends out the TCP packets B1, B2 and B3 to the network.

The TCP packets B1, B2 and B3 sent out to the network are received by the external output module 205B of the network interface device 200B in the host 2.

The external output module 205B transfers the received TCP packets B1, B2 and B3 to the received packet kind determination module 206B.

The received packet kind determination module 206B checks a packet header of each of the TCP packets B1, B2 and B3 to check a kind of the packet.

Since the TCP packets B1, B2 and B3 are retransmission control invalid packets, the received packet kind determination module 206B determines the TCP packets B1, B2 and B3 to be reception data without MAC retransmission control information and transfers the TCP packets B1, B2 and B3 to the program processing device 100B.

In the program processing device 100B, the protocol processing module 102B first executes reception TCP processing.

The protocol processing module 102B restructures the TCP packets B1, B2 and B3 into one data B and transfers the data B to the application processing module 101B. As a result, in such a case of transfer of a short flow formed of a data size less than MSS as the data A, MAC retransmission control can be validated and in such a case of a flow formed of data not less than MSS as the data B, MAC retransmission control can be invalidated.

In the transfer of a short flow formed of two or more packets, however, the MAC retransmission control function cannot be validated according to the present exemplary embodiment. In the present exemplary embodiment, while a final packet of a long flow is also subjected to MAC retransmission control, since it is only the final packet that is subjected to MAC retransmission control, a throughput of the long flow will not be affected.

Effects of the First Exemplary Embodiment

Next, effects of the present exemplary embodiment will be described.

In the present exemplary embodiment, the retransmission control determination module 201 checks a payload size of a transmission packet and when the payload size is MSS, determines the packet to be a long flow packet and when the payload size is less than MSS, determines the packet to be a short flow packet. This enables dynamic control such as executing the MAC retransmission control only at the time of a short flow when the MAC retransmission control is valid and refraining from executing the MAC retransmission control at the time of a long flow when the MAC retransmission control exerts adverse effects.

The reason is that since when a long flow transfer request is notified from the application, the TCP protocol stack divides the data on an MSS basis to generate a TCP packet, monitoring a payload size of the transmission packet enables discrimination of a long flow and a short flow formed of one packet.

In addition, since in the execution of the present exemplary embodiment, discrimination between a short flow and a long flow is made based on a transmission packet size as of after the protocol processing is executed, validation and invalidation of the MAC retransmission control can be realized without changing the protocol processing module 102.

Second Exemplary Embodiment

Next, a second exemplary embodiment of the present invention will be described. The first exemplary embodiment of the present invention enables the MAC retransmission control to be validated only in a short flow formed of data whose size is less than MSS and disables the MAC retransmission control to be validated in a short flow formed of two or more packets. The second exemplary embodiment enables the MAC retransmission control to be validated even in these cases.

Since structure of the present exemplary embodiment and operation of the reception processing are the same as the structure shown in FIG. 1 and the operation shown in FIG. 3 of the first exemplary embodiment, no detailed description will be made thereof here.

Description of Operation of the Second Exemplary Embodiment

Description will be made of operation of transmission processing according to the second exemplary embodiment.

Figure 2:
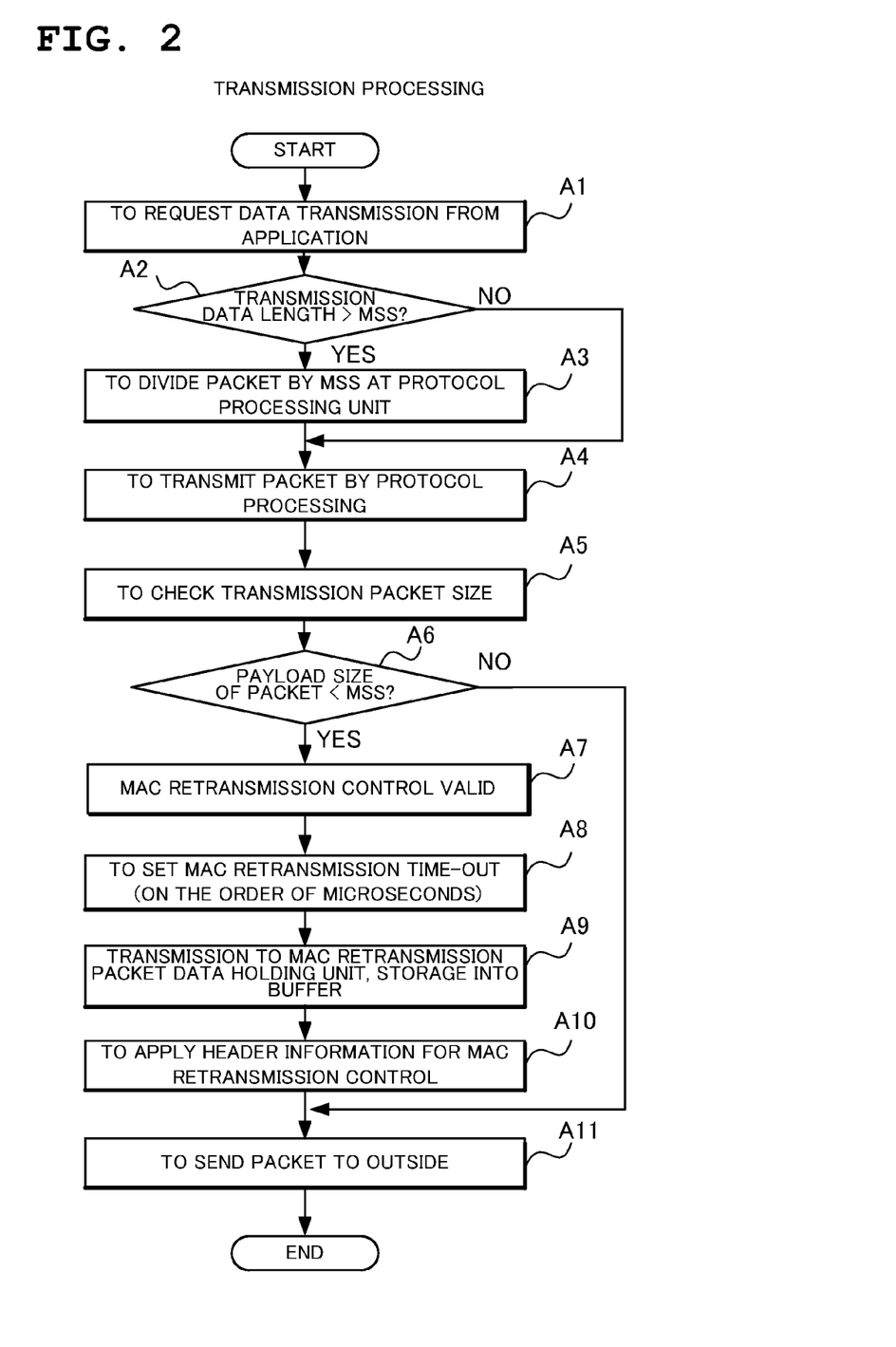
FIG. 2 is a flow chart showing operation of transmission processing according to the first exemplary embodiment.
Figure 5:
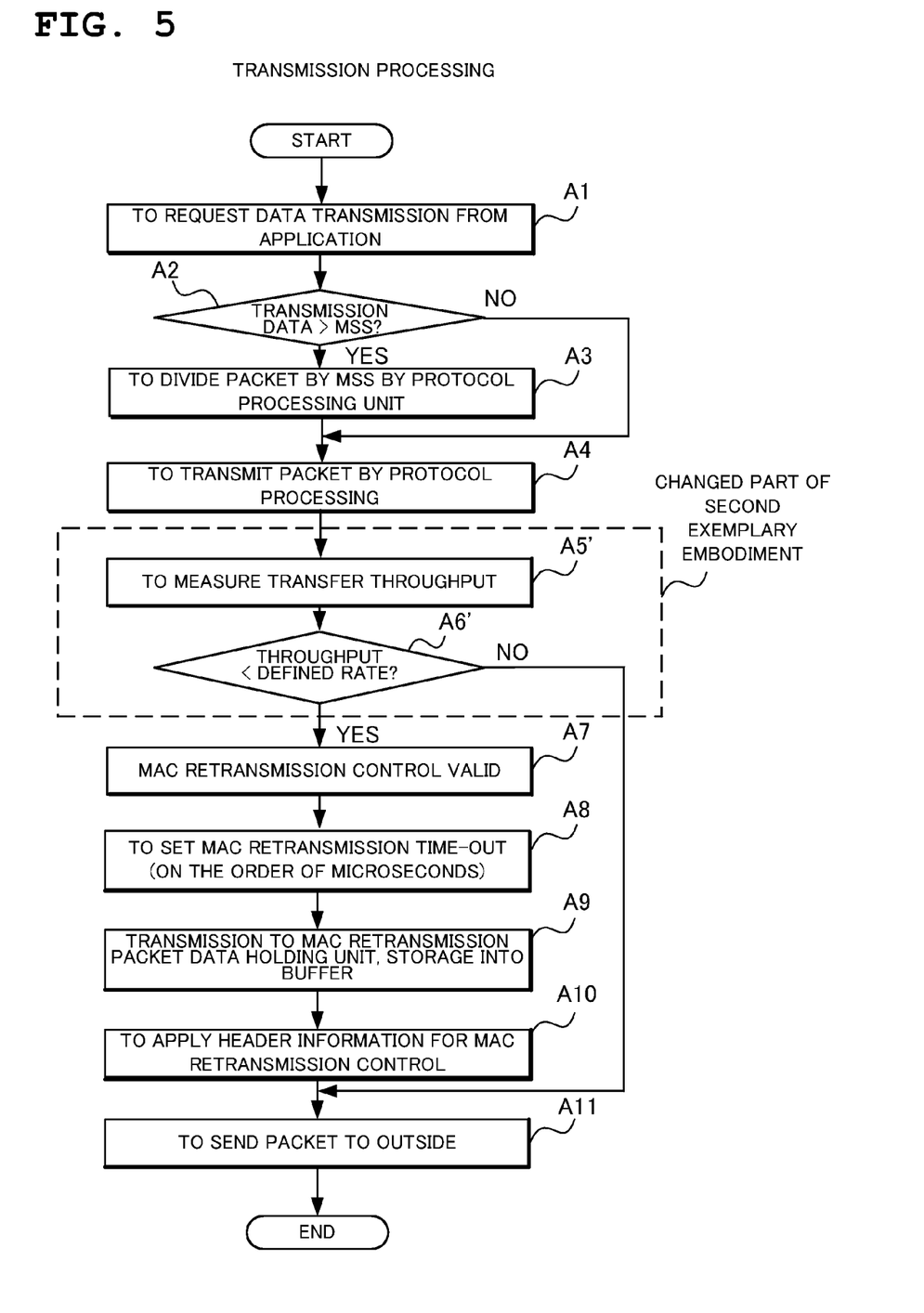
FIG. 5 is a flow chart showing operation of transmission processing according to a second exemplary embodiment of the present invention.

With reference to FIG. 5, the second exemplary embodiment of the present invention differs in replacing Steps A5 and A6 in the flow shown in FIG. 2 by Steps A5' and A6'.

While in the first exemplary embodiment, the retransmission control determination module 201 checks a payload size of a packet, in the present exemplary embodiment, a packet sending rate (throughput) is obtained from a valid length of a packet having passed through within a defined time (Step A5') and when the obtained sending rate is not less than a rate defined in advance (defined value), determination is made that the MAC retransmission control is invalid and when it is less than the defined rate, determination is made that the MAC retransmission control is valid. As a defined value of a throughput to be compared with an obtained sending rate, a line rate is set, for example. With 1000 BASE-T, for example, set the defined value to be 1 Gbps and with 1 GBASE-T, set the defined value to be 10 Gbps.

Effects of the Second Exemplary Embodiment

With the foregoing arrangement, when a throughput is small enough to prevent overload on switch, the MAC retransmission control can be validated and when the throughput is large, the MAC retransmission control can be invalidated. More specifically, using a throughput for the determination of MAC retransmission control switching enables dynamic switching between validation and invalidation of the MAC retransmission control in a short flow and a long flow.

This also enables the MAC retransmission control to be valid even in a short flow formed of two or more packets, thereby reducing a flow completion time.

The reason is that in a case of a short flow where the number of packets forming one flow is small, no increase in a throughput is caused by slow start of TCP. On the other hand, in a case of a long flow where the number of packets is large, the state of TCP changes from slow start to congestion avoidance, resulting in having a larger throughput than that in a short flow.

Furthermore, dynamic switching between validation and invalidation of the MAC retransmission control is enabled without changing a protocol stack. The reason is that a transfer throughput of a packet whose protocol processing is completed is a basis for determining whether the MAC retransmission control is valid or invalid.

Third Exemplary Embodiment

In the first and second exemplary embodiments of the present invention, the retransmission control determination module 201 of the network interface device 200 determines whether the MAC retransmission control is valid or invalid based on a fixed determination reference.

There might occur a case, however, where the MAC retransmission control should be validated even in a long flow or conversely where the MAC retransmission control should be invalidated even in a short flow.

The third exemplary embodiment is therefore structured such that an application side explicitly designates the MAC retransmission control to be valid or invalid.

Since structure of the present exemplary embodiment and operation of the reception processing are the same as the structure shown in FIG. 1 and the operation shown in FIG. 3 of the first exemplary embodiment, no detailed description will be made thereof here.

Description of Operation of the Third Exemplary Embodiment

Description will be made of operation of transmission processing according to the third exemplary embodiment.

Figure 6:
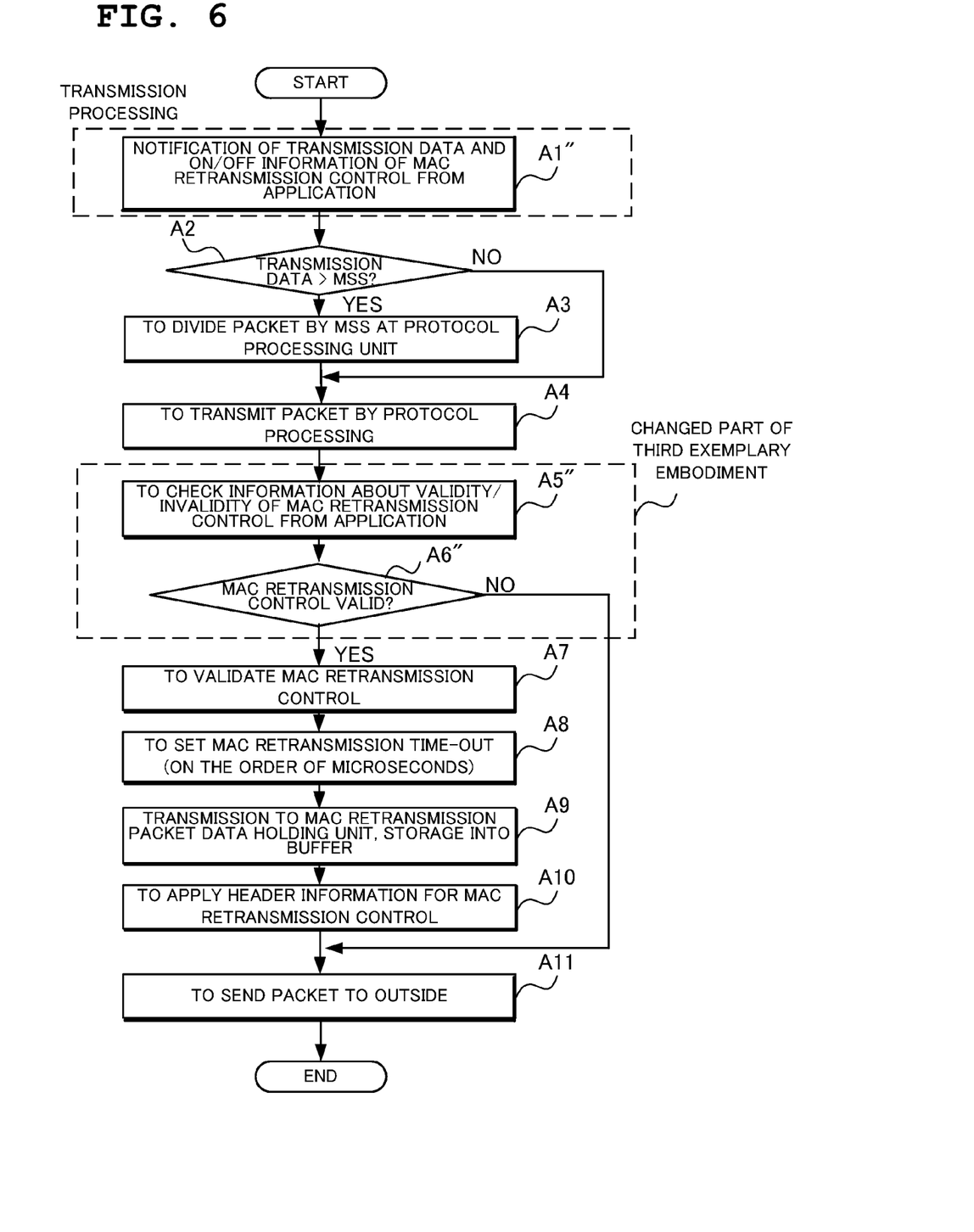
FIG. 6 is a flow chart showing operation of transmission processing according to a third exemplary embodiment of the present invention.

With reference to FIG. 6, the present exemplary embodiment differs from the flow chart shown in FIG. 2 in replacing Steps A1 by Step A1", and Steps A5 and A6 by Steps A5" and A6".

In the third exemplary embodiment, when the application processing module 101 transmits data, notify information about validity and invalidity of the MAC retransmission control together with transmission data (Step A1").

As an example of a means for notifying validity or invalidity of the MAC retransmission control, possible are notification by a Socket option, a flag setting field of a Sendto system call as a Socket data transmission function, and notification using a dedicated API.

After the protocol processing at the protocol processing module 102, the retransmission control determination module 201 of the network interface device 200 checks information about validity or invalidity of the MAC retransmission control notified by the application processing module 101 (Step A5").

As a result of the check, when notified that the MAC retransmission control is valid, validate the MAC retransmission control of a packet corresponding to the data in question and when notified that it is invalid, refrain from executing the MAC retransmission control.

Effects of the Third Exemplary Embodiment

According to the third exemplary embodiment, notifying the network interface device of the information related to validity and invalidity of the MAC retransmission control together with sending-out data by the application enables the application side to explicitly designate need or no-need of the MAC retransmission control for the transmission control.

Fourth Exemplary Embodiment

Next, a fourth exemplary embodiment of the present invention will be described.

While in the first to third exemplary embodiments of the present invention, the MAC retransmission control is executed by the hardware processing of the network interface device 2, the MAC retransmission control can be executed by the software processing of the program processing device 1.

The fourth exemplary embodiment is an exemplary embodiment in a case where the MAC retransmission control is realized by software processing.

Figure 7:
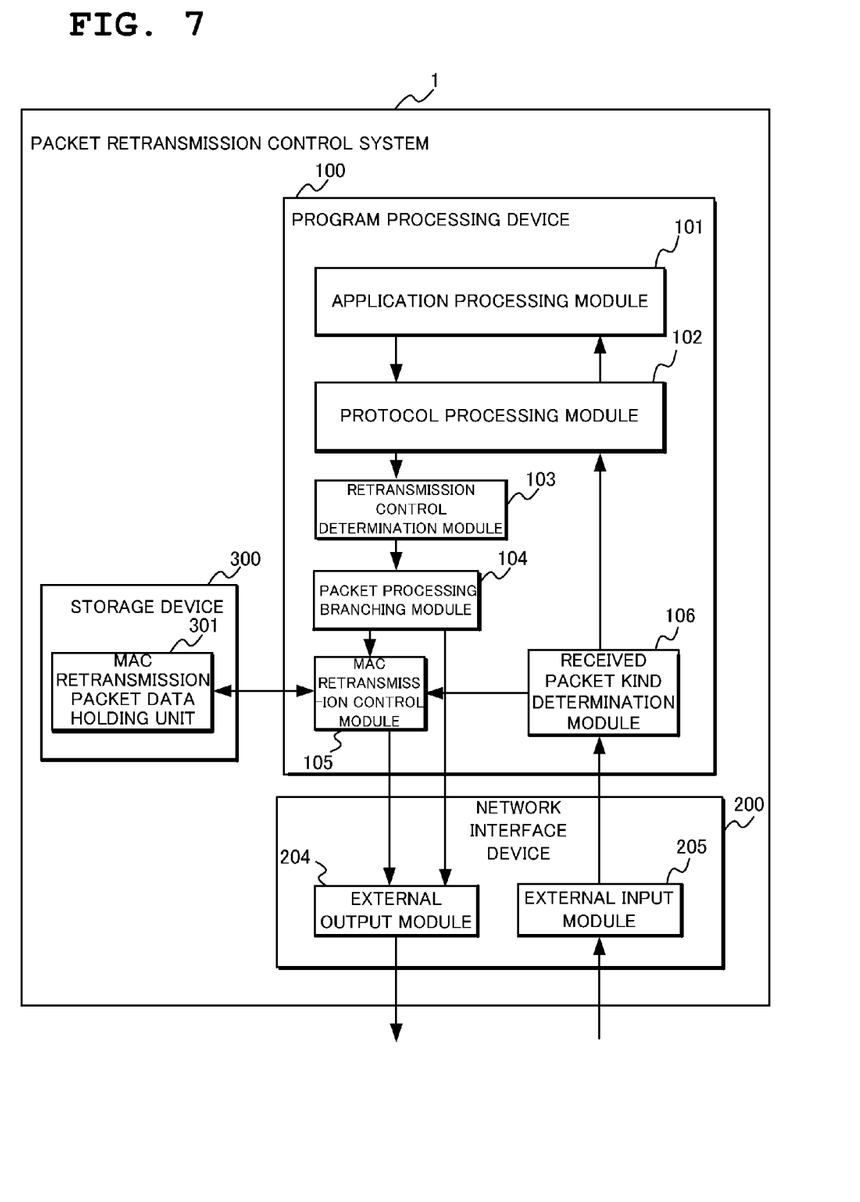
FIG. 7 is a block diagram showing a structure according to a fourth exemplary embodiment of the present invention.

With reference to FIG. 7, the packet retransmission control system 1 according to the fourth exemplary embodiment of the present invention includes the program processing device 100, the network interface device 200 and the storage device 300.

The program processing device 100 includes the application processing module 101 which executes an application, the protocol processing module 102 which executes protocol processing such as TCP, the retransmission control determination module 103 which makes packet retransmission control determination, the packet processing branching module 104 which allocates a retransmission control valid packet and a retransmission control invalid packet, the MAC retransmission control module 105 which executes packet retransmission control and the received packet kind determination module 106 which determines a kind of a received packet.

The retransmission control determination module 103 realizes an equivalent function to that of the retransmission control determination module 201 of any of the first to third exemplary embodiments.

The packet processing branching module 104, the MAC retransmission control module 105 and the received packet kind determination module 106 realize equivalent functions to those in any of the first to third exemplary embodiments as well.

Description of Operation of the Fourth Exemplary Embodiment

Since operation of the present exemplary embodiment is the same as the operation of any of the above-described first to third exemplary embodiments, no description will be made thereof.

While in the first exemplary embodiment, Steps A6 through A11 are executed by the network interface device 200, in the present exemplary embodiment, they are executed by the software processing at the program processing device 100.

Effects of the Fourth Exemplary Embodiment

Thus structured present exemplary embodiment enables the MAC retransmission control to be realized by the software processing by the program processing device 100.

Figure 8:
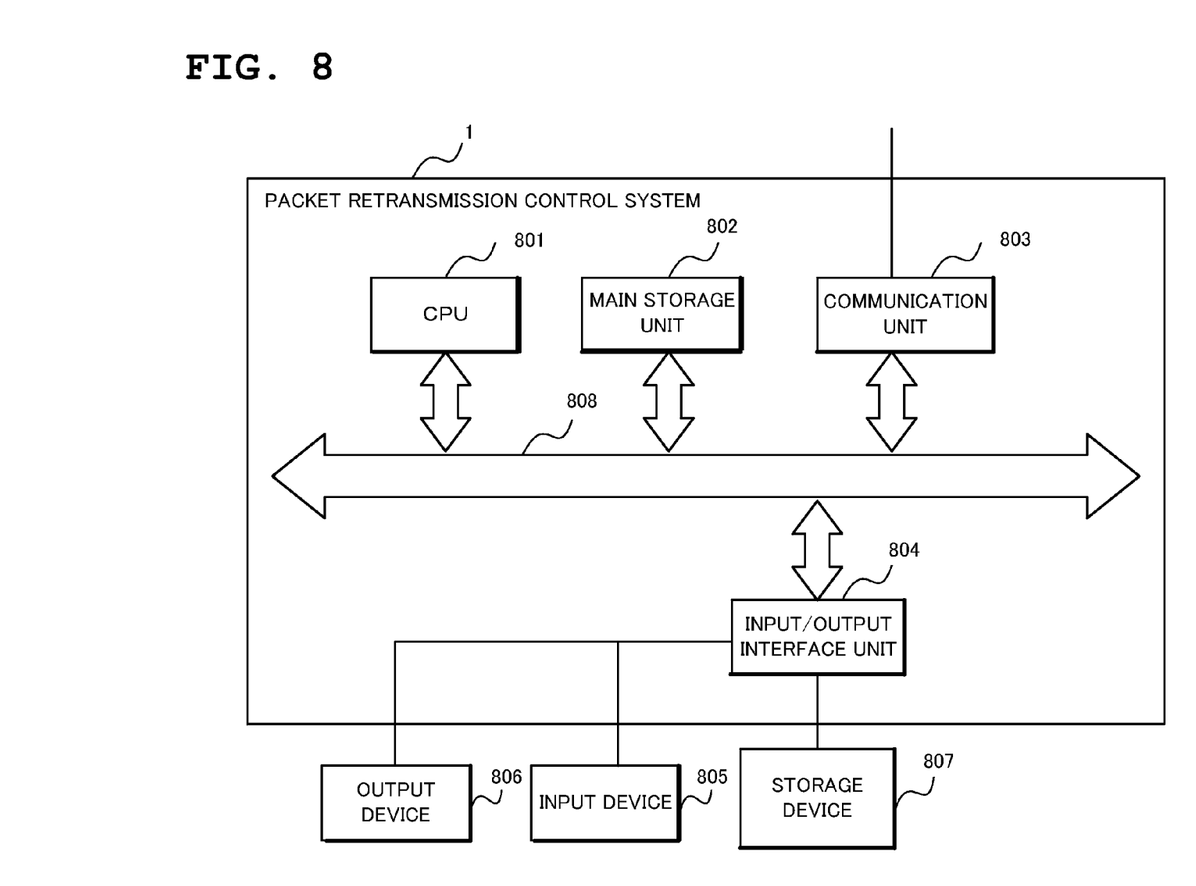
FIG. 8 is a block diagram showing an example of a hardware structure of a packet retransmission control system according to the present invention.

Next, description will be made of an example of a hardware structure of the packet retransmission control system 1 with reference to FIG. 8. FIG. 8 is a block diagram showing an example of a hardware structure of the packet retransmission control system 1.

With reference to FIG. 8, the packet retransmission control system 1, which has the same hardware structure as that of a common computer device, comprises a CPU (Central Processing Unit) 801, a main storage unit 802 formed of such a memory as a RAM (Random Access Memory) for use as a data working region or a data temporary saving region, a communication unit 803 which transmits and receives data through a network, an input/output interface unit 804 connected to an input device 805, an output device 806 and a storage device 807 to transmit and receive data, and a system bus 808 which connects each of the above-described components with each other. The storage device 807 is formed, for example, of a non-volatile memory such as a flash ROM (Read Only Memory), a magnetic disk and a semiconductor memory.

The program processing device 100, the network interface device 200 and the storage device 300 of the packet retransmission control system 1 according to the present exemplary embodiment have their operations realized not only in hardware by mounting a circuit part as a hardware part such as an LSI (Large Scale Integration) having a program incorporated but also in software by storing a program which provides each function in the subsidiary storage unit 807 and loading the program into the main storage unit 802 to execute the same by the CPU 801.

Although the present invention has been described with respect to the preferred exemplary embodiments in the foregoing, the present invention is not necessarily limited to the above-described exemplary embodiments but can be modified without departing from the scope of its technical idea.

INCORPORATION BY REFERENCE

This application is based upon and claims the benefit of priority from Japanese patent application No. 2009-078490, filed on Mar. 27, 2009, the disclosure of which is incorporated herein in its entirety by reference.

What is claimed is:

1. A packet retransmission control system which executes high-speed retransmission control of a lower layer of a transmission packet by a retransmission time-out shorter in time than a protocol of a transport layer, comprising:
   a retransmission control determination module which determines whether to execute high-speed retransmission control by a lower layer based on a predetermined condition with respect to a packet to be transmitted;
   an MAC retransmission control module which executes retransmission control of a transmission packet by the retransmission time-out shorter in time than the protocol of the transport layer with respect to a packet determined to be subjected to high-speed retransmission control; and
   an external output module which externally outputs a packet subjected to retransmission control by the MAC retransmission control module or a packet whose high-speed retransmission control is determined to be unnecessary.

2. The packet retransmission control system according to claim 1, wherein the retransmission control determination module checks a packet size of a transmission packet and when a payload size excluding a header of the packet is less than a defined value set as the predetermined condition, determines to execute high-speed retransmission control of the lower layer.

3. The packet retransmission control system according to claim 2, wherein the defined value of the payload size is the maximum data size defined by the transport layer including a maximum segment size of TCP.

4. The packet retransmission control system according to claim 1, wherein the retransmission control determination module monitors an output throughput of transmission data and when the throughput is less than a defined value set as the predetermined condition, determines to execute high-speed retransmission control of the lower layer.

5. The packet retransmission control system according to claim 4, wherein the defined value of the throughput is a line rate.

6. The packet retransmission control system according to claim 1, further comprising a protocol processing module on which the protocol of the transport layer operates, wherein
   data whose transmission is requested from the application processing module is divided by a fixed size that can be sent out to a network by the protocol processing module and is sent out to the retransmission control determination module as a packet.

7. The packet retransmission control system according to claim 1, wherein the MAC retransmission control module sets a short retransmission time-out and stores a packet in a MAC retransmission packet data holding unit, as well as applying a header for MAC retransmission control to a transmission packet to transfer the obtained packet to the external output module.

8. The packet retransmission control system according to claim 7, wherein when an arrival notification of ACK for the transmission packet with the header for retransmission control attached is not made within the retransmission time-out time, the MAC retransmission control module reads a packet to be retransmitted from the MAC retransmission packet data holding unit and applies the header for retransmission control to the transmission packet to be retransmitted to transfer the obtained packet to the external output module.

9. The packet retransmission control system according to claim 7, further comprising:
   an external input module which receives an external packet, and
   a received packet determination module which discriminates a kind of a packet sent from the external input module and when the received packet has none of the header for MAC retransmission control, sends the received packet to the protocol processing module and when the received packet has the header for MAC retransmission control and is ACK for a packet sent from the MAC retransmission control module, notifies the MAC retransmission control module of information about ACK, wherein the MAC retransmission control module, upon receiving a notification from the received packet determination module, releases the retransmission time-out of the packet.

10. The packet retransmission control system according to claim 9, wherein when the received packet has the header for MAC retransmission control but is not ACK for a packet sent from the MAC retransmission control module, the received packet determination module externally outputs ACK for MAC retransmission control through the external output module.

11. A packet retransmission control method by a packet retransmission control system which executes high-speed retransmission control of a lower layer of a transmission packet by a retransmission time-out shorter in time than a protocol of a transport layer, comprising:
the packet retransmission control system executing a retransmission control determination step of determining whether to execute high-speed retransmission control by a lower layer based on a predetermined condition with respect to a packet to be transmitted;
the packet retransmission control system executing a MAC retransmission control step of executing retransmission control of a transmission packet by the retransmission time-out shorter in time than the protocol of the transport layer with respect to a packet determined to be subjected to high-speed retransmission control; and
the packet retransmission control system executing an external output step of externally outputting a packet subjected to retransmission control by the MAC retransmission control step or a packet whose high-speed retransmission control is determined to be unnecessary.

12. The packet retransmission control method according to claim 11, wherein at the retransmission control determination step, a packet size of a transmission packet is checked and when a payload size excluding a header of the packet is less than a defined value set as the predetermined condition, determination is made to execute high-speed retransmission control of the lower layer.

13. The packet retransmission control method according to claim 12, wherein the defined value of the payload size is the maximum data size defined by the transport layer including a maximum segment size of TCP.

14. The packet retransmission control method according to claim 11, wherein at the retransmission control determination step, an output throughput of transmission data is monitored and when the throughput is less than a defined value set as the predetermined condition, determination is made to execute high-speed retransmission control of the lower layer.

15. The packet retransmission control method according to claim 14, wherein the defined value of the throughput is a line rate.

16. The packet retransmission control method according to claim 11, comprising a protocol processing step in which the protocol of the transport layer operates, wherein
data whose transmission is requested from the application processing step is divided by a fixed size that can be sent out to a network by the protocol processing step and is sent out to the retransmission control determination step as a packet.

17. The packet retransmission control method according to claim 11, wherein at the MAC retransmission control step, a short retransmission time-out is set to store a packet in a MAC retransmission packet data holding unit, as well as applying a header for MAC retransmission control to a transmission packet to transfer the obtained packet to the external output step.

18. The packet retransmission control method according to claim 17, wherein when an arrival notification of ACK for the transmission packet with the header for retransmission control attached is not made within the retransmission time-out time at the MAC retransmission control step, a packet to be retransmitted is read from the MAC retransmission packet data holding unit to apply the header for retransmission control to the transmission packet to be retransmitted and transfer the obtained packet to the external output step.

19. The packet retransmission control method according to claim 17, further comprising:
an external input step of receiving an external packet; and
a received packet determination step of discriminating a kind of a packet sent from the external input step and when the received packet has none of the header for MAC retransmission control, sending the received packet to the protocol processing step and when the received packet has the header for MAC retransmission control and is ACK for a packet sent from the MAC retransmission control step, notifying the MAC retransmission control step of information about ACK, wherein
at the MAC retransmission control step, upon receiving a notification from the received packet determination step, the retransmission time-out of the packet is released.

20. The packet retransmission control method according to claim 19, wherein when at the received packet determination step, the received packet has the header for MAC retransmission control but is not ACK for a packet sent from the MAC retransmission control step, ACK for MAC retransmission control is externally output through the external output step.

21. A non-transitory computer readable medium storing a packet retransmission control program executed on a computer forming a packet retransmission control system which executes high-speed retransmission control of a lower layer of a transmission packet by a retransmission time-out shorter in time than a protocol of a transport layer, wherein the packet retransmission control program causes the computer device to execute:
a retransmission control determination function of determining whether to execute high-speed retransmission control by a lower layer based on a predetermined condition with respect to a packet to be transmitted;
a MAC retransmission control function of executing retransmission control of a transmission packet by the retransmission time-out shorter in time than the protocol of the transport layer with respect to a packet determined to be subjected to high-speed retransmission control; and
an external output function of externally outputting a packet subjected to retransmission control by the MAC retransmission control function or a packet whose high-speed retransmission control is determined to be unnecessary.

22. The non-transitory computer readable medium according to claim 21, wherein in the retransmission control determination function, a packet size of a transmission packet is checked and when a payload size excluding a header of the packet is less than a defined value set as the predetermined condition, determination is made to execute high-speed retransmission control of the lower layer.

23. The non-transitory computer readable medium according to claim 22, wherein the defined value of the payload size is the maximum data size defined by the transport layer including a maximum segment size of TCP.

24. The non-transitory computer readable medium according to claim 21, wherein in the retransmission control determination function, an output throughput of transmission data is monitored and when the throughput is less than a defined value set as the predetermined rule, determination is made to execute high-speed retransmission control of the lower layer.

25. The non-transitory computer readable medium according to claim 24, wherein the defined value of the throughput is a line rate.

26. The non-transitory computer readable medium according to claim 21, wherein the packet retransmission control program causes the computer device to execute a protocol processing function in which the protocol of the transport layer operates, wherein
data whose transmission is requested from the application processing function is divided by a fixed size that can be sent out to a network by the protocol processing function and is sent out to the retransmission control determination function as a packet.

27. The non-transitory computer readable medium according to claim 21, wherein in the MAC retransmission control function, a short retransmission time-out is set to store a packet in a MAC retransmission packet data holding unit, as well as applying a header for MAC retransmission control to a transmission packet to transfer the obtained packet to the external output function.

28. The non-transitory computer readable medium according to claim 27, wherein when an arrival notification of ACK for the transmission packet with the header for retransmission control attached is not made within the retransmission time-out time in the MAC retransmission control function, a packet to be retransmitted is read from the MAC retransmission packet data holding unit to apply the header for retransmission control to the transmission packet to be retransmitted and transfer the obtained packet to the external output function.

29. The non-transitory computer readable medium according to claim 27, wherein the packet retransmission control program causes the computer device to execute:
   an external input function of receiving an external packet, and
   a received packet determination function of discriminating a kind of a packet sent from the external input function and when the received packet has none of the header for MAC retransmission control, sending the received packet to the protocol processing function and when the received packet has the header for MAC retransmission control and is ACK for a packet sent from the MAC retransmission control function, notifying the MAC retransmission control function of information about ACK, wherein
   in the MAC retransmission control function, upon receiving a notification from the received packet determination function, the retransmission time-out of the packet is released.

30. The non-transitory computer readable medium according to claim 29, wherein when in the received packet determination function, the received packet has the header for MAC retransmission control but is not ACK for a packet sent from the MAC retransmission control function, ACK for MAC retransmission control is externally output through the external output function.

\* \* \* \* \*